United States Patent
Matsuzaki

(10) Patent No.: US 7,444,492 B2
(45) Date of Patent: Oct. 28, 2008

(54) PROCESSOR, VIRTUAL MEMORY SYSTEM, AND VIRTUAL STORING METHOD

(75) Inventor: Hidenori Matsuzaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 11/326,194

(22) Filed: Jan. 6, 2006

(65) Prior Publication Data

US 2007/0005931 A1 Jan. 4, 2007

(30) Foreign Application Priority Data

Jul. 1, 2005 (JP) ............................. 2005-194086

(51) Int. Cl.
*G06F 12/00* (2006.01)
*G06F 13/00* (2006.01)

(52) U.S. Cl. ...................... 711/203; 711/100; 711/147; 711/154

(58) Field of Classification Search .................. 711/147, 711/150, 154, 203, 100, 200

See application file for complete search history.

(56) References Cited

U.S. PATENT DOCUMENTS 5,678,021 A  10/1997  Pawate et al.
6,807,614 B2 * 10/2004  Chung ........................ 711/168

OTHER PUBLICATIONS

Zhang et al.; "The Impulse Memory Controller"; IEEE Trans on Computers, Special Issue on Advances in High Performance Memory System, pp. 1-35, (2001).
Pham et al.; "10.2 The Design and Implementation of a First-Generation Cell Processor"; IEEE International Solid-State Circuits Conference, pp. 184, 185, and 592, (2005).

* cited by examiner

*Primary Examiner*—Tuan V. Thai
(74) *Attorney, Agent, or Firm*—Finnegan, Henderson, Farabow, Garrett & Dunner, L.L.P.

(57) ABSTRACT

A processor includes an address specifying unit that specifies an address range on a virtual storage area; an instruction code setting unit that sets an instruction code for a process of deciding data corresponding to the specified address range; a calculating unit that calculates the data corresponding to the address range, according to the instruction code set for the address range; a load instruction obtaining unit that obtains a load instruction for the specified address range; and a data output unit that supplies the data calculated by the calculating unit corresponding to the address range indicated by the load instruction, as data for the load instruction.

10 Claims, 12 Drawing Sheets

PROCESSOR, VIRTUAL MEMORY SYSTEM, AND VIRTUAL STORING METHOD

CROSS-REFERENCE TO RELATED APPLICATIONS

This application is based upon and claims the benefit of priority from the prior Japanese Patent Application No. 2005-194086, filed on Jul. 1, 2005; the entire contents of which are incorporated herein by reference.

BACKGROUND OF THE INVENTION

1. Field of the Invention

The invention relates to a processor for computing (operation), a virtual memory system, and a virtual storing method.

2. Description of the Related Art

Multiprocessor systems have been heretofore proposed as means for improving computing power of a system. In addition, in recent years, further miniaturization of the process realizes a chip multiprocessor system in which a plurality of processor cores is mounted on one chip.

The chip multiprocessor system generally adopts a structure of connecting a plurality of processors, a memory interface with an external memory, and an external device interface, to a system bus within the chip. The respective processors within the chip perform the processing while referring to and updating the data in the external memory through the memory interface.

It is known that the respective processors perform the processing in cooperation with each other while transferring data among the processors directly toward each local memory built in each of the processors through the system bus (for example, see "10.2 The Design and Implementation of a First-Generation CELL Processor" D. Pham et al., 2005 IEEE International Solid-State Circuits Conference (ISSCC)).

As mentioned above, the computing power of the chip can be enhanced according to the miniaturization of the process with a plurality of processor cores mounted on the chip. Physically and in view of a cost, however, it is not easy to improve the capacity and the bandwidth of each external memory which supplies data to each of the processor cores in proportion to the number of the processors.

When plural processor cores request access to the external memory at the same time, they will scramble for the limited memory bandwidth. This results in a dissatisfactory performance which falls short of expectations.

Further, the memory capacity usable by the respective processor cores is relatively decreased. The shortage of the memory capacity often hampers full utilization of the enhanced computing power.

These problems can occur not only in the multiprocessor system but also in a single processor system. The number of the transistors increases according to the miniaturization. The additional transistors can be utilized for the speed-up of the single processor core. The capacity and the bandwidth of the data, however, are difficult to increase accordingly.

SUMMARY OF THE INVENTION

According to one aspect of the present invention, a processor includes an address specifying unit that specifies an address range on a virtual storage area; an instruction code setting unit that sets an instruction code for a process of deciding data corresponding to the specified address range; a calculating unit that calculates the data corresponding to the address range, according to the instruction code set for the address range; a load instruction obtaining unit that obtains a load instruction for the specified address range; and a data output unit that supplies the data calculated by the calculating unit corresponding to the address range indicated by the load instruction, as data for the load instruction.

According to another aspect of the present invention, a virtual memory system has a first processor and a second processor, and each of the first processor and the second processor includes an address specifying unit that specifies an address range on a virtual storage area, an instruction code setting unit that sets an instruction code for a process of deciding data corresponding to the specified address range; a calculating unit that calculates the data corresponding to the address range, according to the instruction code set for the address range, a load instruction obtaining unit that obtains a load instruction for the specified address range; and a data output unit that supplies the data calculated by the calculating unit corresponding to the address range indicated by the load instruction, as the data for the load instruction, and the calculating unit of the first processor issues a load instruction to the second processor, the load instruction obtaining unit of the second processor obtains the load instruction from the first processor, the calculating unit of the second processor calculates the data for the load instruction obtained from the first processor, the data output unit of the second processor supplies the data obtained through the calculating unit of the second processor to the first processor, and the calculating unit of the first processor calculates the data, using the data obtained from the second processor.

According to still another aspect of the present invention, a virtual storing method using a processor, includes specifying an address range on a virtual storage area; setting an instruction code for a process of deciding data corresponding to the specified address range; calculating the data corresponding to the address range, according to the instruction code set for the address range; obtaining a load instruction for the specified address range; and supplying the data calculated corresponding to the address range indicated by the load instruction, as data for the load instruction.

According to still another aspect of the present invention, a virtual storing method using a first processor and a second processor, includes specifying an address range on a virtual storage area in the first processor; setting an instruction code for a process of deciding data corresponding to the specified address range in the first processor; specifying an address range on a virtual storage area in the second processor; setting an instruction code for a process of deciding the data corresponding to the specified address range in the second processor; issuing a load instruction from the first processor to the second processor; specifying the address range indicated by the load instruction in the second processor; calculating the data for the address range according to the instruction code set for the address range, in the second processor; supplying the calculated data from the second processor to the first processor; calculating the data for the address range by using the supplied data in the first processor; obtaining the load instruction for the specified address range in the first processor; and supplying the data calculated for the address range indicated by the load instruction as the data for the obtained load instruction in the first processor.

The processor according to the invention works as a virtual memory, which improves the memory capacity and the bandwidth of the whole system in which the processor is mounted. The enhanced memory capacity effectively resolves a gap between the computing power and the data supply ability.

DETAILED DESCRIPTION OF THE INVENTION

Hereinafter, preferred embodiments of a processor, a virtual memory system, and a virtual storing method according to the present invention will be described in detail according to the accompanying drawings. Here, the embodiments are not to limit the invention.

Figure 1:
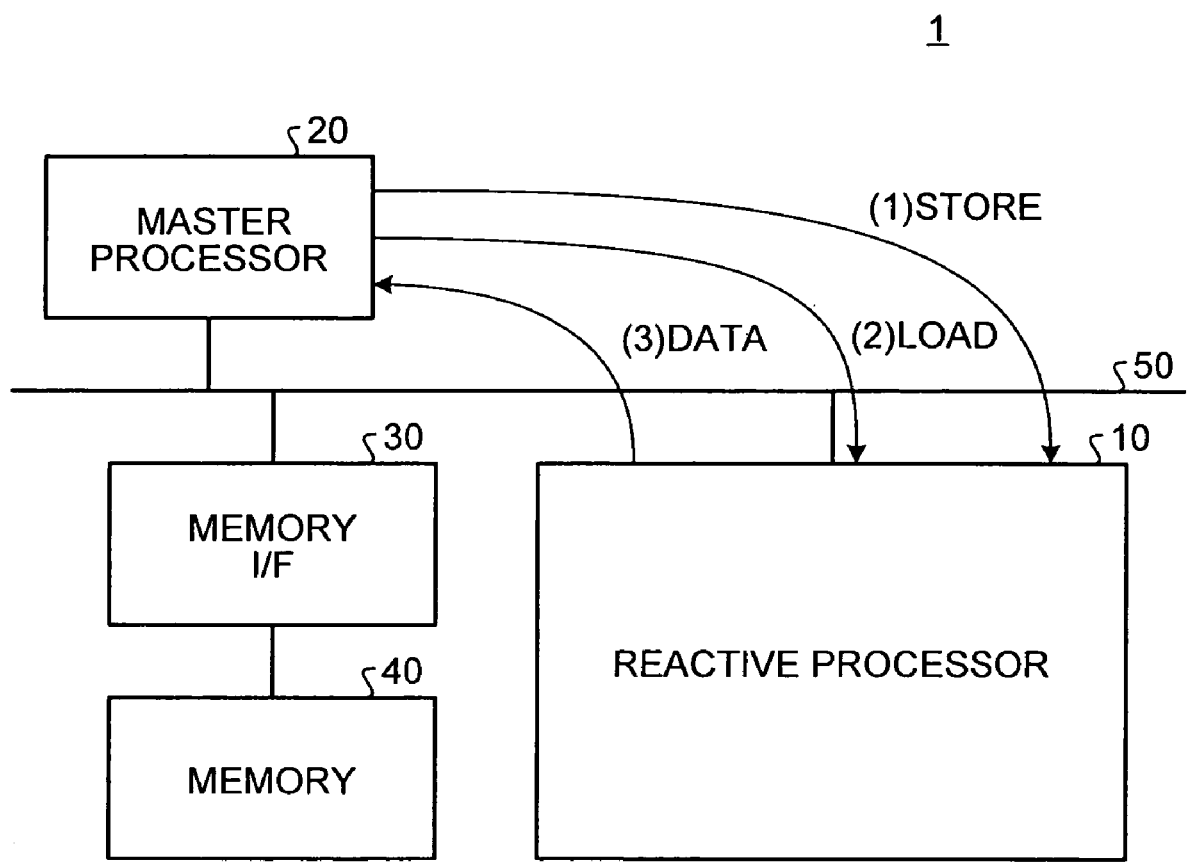
FIG. 1 is a block diagram of an overall structure of a memory system according to a first embodiment.

FIG. 1 is a block diagram of an overall structure of a memory system 1. The memory system 1 includes a reactive processor 10, a master processor 20, a memory interface (I/F) 30, and a memory 40. They are connected to a system bus 50.

The memory 40 stores data or the like which is utilized by the reactive processor 10 in the actual memory space. The reactive processor 10 has a virtual memory space. The reactive processor 10 acquires data corresponding to a load instruction through calculation on the virtual address in the virtual memory space.

The master processor 20 performs the processing while loading and storing data into the reactive processor 10 and the memory I/F 30. The master processor 20 registers an instruction code corresponding to each virtual address and an address range where the instruction code is assigned, previously into an internal register of the reactive processor 10 (STORE) when the virtual memory of the reactive processor 10 is used as the data area. Here, the instruction code means a program for calculating the data of the respective virtual addresses. The address range means a predetermined range in a virtual storage area. The master processor 20 issues a load instruction for a desired virtual address as necessary (LOAD) and acquires data corresponding to the load instruction (DATA).

Figure 2:
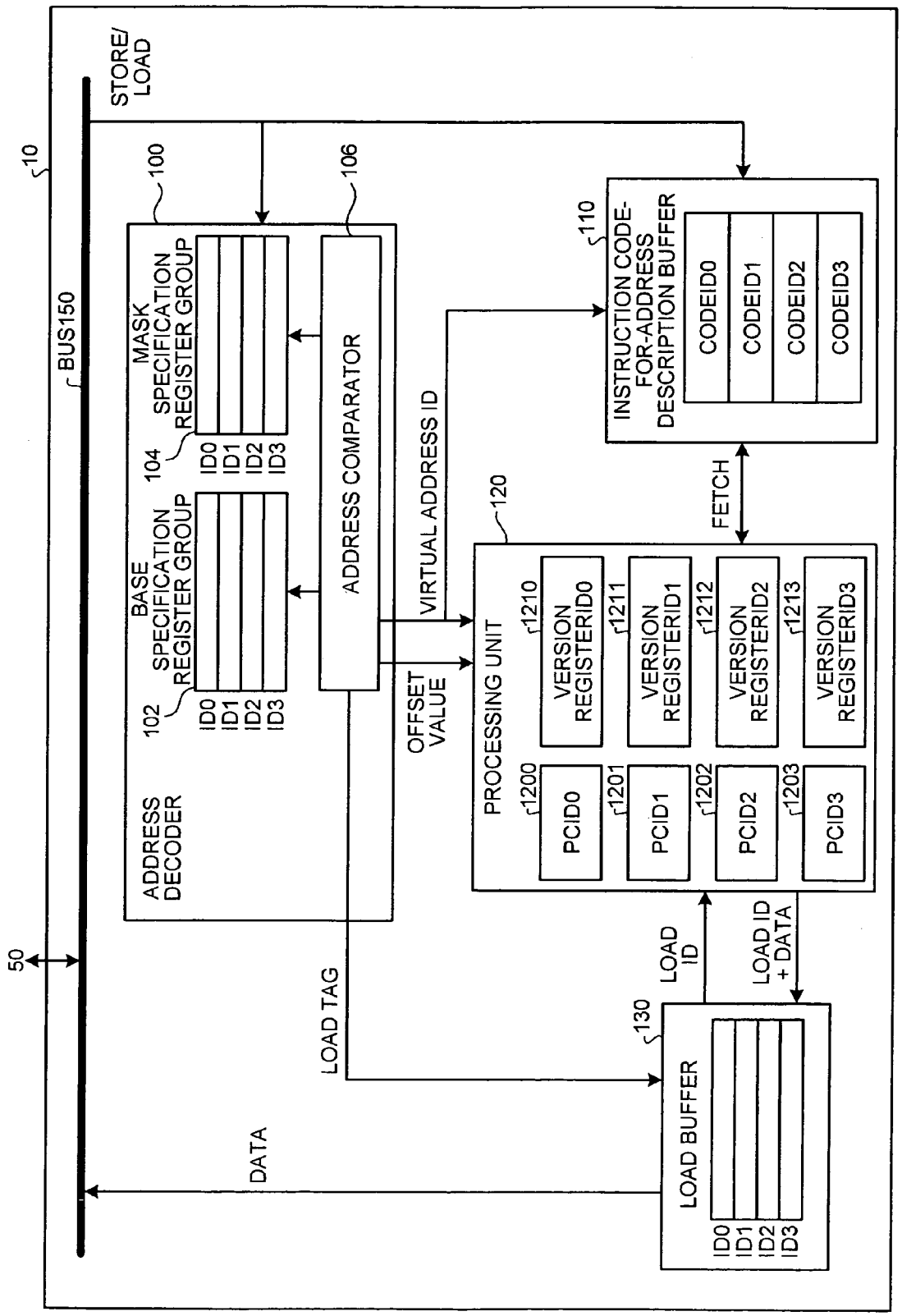
FIG. 2 is a block diagram of a functional structure of a reactive processor in the memory system.

FIG. 2 is a block diagram of a functional structure of the reactive processor 10. The reactive processor 10 includes an address decoder 100, an instruction code-for-address description buffer 110, a processing unit 120, and a load buffer 130. They are connected to a bus 150.

The address decoder 100 of the reactive processor 10 shown in FIG. 2 has a base specification register group 102 including four base specification registers of virtual addresses ID0 to ID3, a mask specification register group 104 including four mask specification registers of virtual addresses ID0 to ID3, and an address comparator 106.

In the embodiment, the base specification register group 102 includes the four base specification registers of the virtual address ID0 to the virtual address ID3. The mask specification register group 104 includes the four mask specification registers of the virtual address ID0 to the virtual address ID3. It means that four kinds of address ranges can be held at the same time.

The address comparator 106 compares an address range shown in the load instruction with a value held in the base specification register group 102 and the mask specification register group 104 to specify the virtual address ID corresponding to the address range shown in the load instruction. A load tag attached to the load instruction is registered into load ID0 to load ID3 of the load buffer 130. Here, the load tag means load instruction identification information for the identification of the load instruction over the bus.

The load buffer 130 stores the load tags for the respective load instructions. When the process corresponding to the load instruction is performed, the load buffer 130 delivers load IDn, in which the load tag is registered, to the processing unit 120. The load buffer 130 further renders the load ID corresponding to the load instruction in execution in the processing unit 120 active, to identify the load instruction being executed in the processing unit 120.

The instruction code-for-address description buffer 110 has four entries of the virtual addresses ID0 to ID3. The respective entries hold the instruction codes to be executed in the respective address ranges corresponding to the respective identical virtual address IDn (n=0 to 3).

The processing unit 120 has four processor cores (PCIDn) 1200 to 1203. Further, the processing unit 120 has four version registers 1210 to 1213 corresponding to the respective PCIDn 1200 to 1203.

Each of the processor cores 1200 to 1203 executes a predetermined instruction code of the instruction codes stored in the instruction code-for-address description buffer 110. Each of the version registers 1210 to 1213 holds the load IDn corresponding to the instruction code being executed by the corresponding processor core.

In the embodiment, since the four processor cores and the four load buffers are provided, four processes of the identical instruction code as for a plurality of addresses can be performed at the same time.

The number of various registers is not limited to that of the embodiment. In order to make it possible to keep the number P of addresses simultaneously, there has to be provided at least the number P of the base specification registers, the number P of the mask specification registers, and the number P of the instruction code-for address description buffers.

In order to make it possible to process the number Q of the load instructions simultaneously, the load buffer 130 has to be provided with the number Q of the entries and the processing unit 120 has to be provided with the number Q of the processor cores and the number Q of the version registers.

In order to allow for the simultaneous execution of plural processes, the processing unit 120 may be provided with the number Q of the multiprocessor elements. A re-configurable logic may be used for the processing unit 120. Alternatively, the processing unit may be one processor element having a function of performing a plurality of tasks simultaneously and identifying the respective processes.

Figure 3:
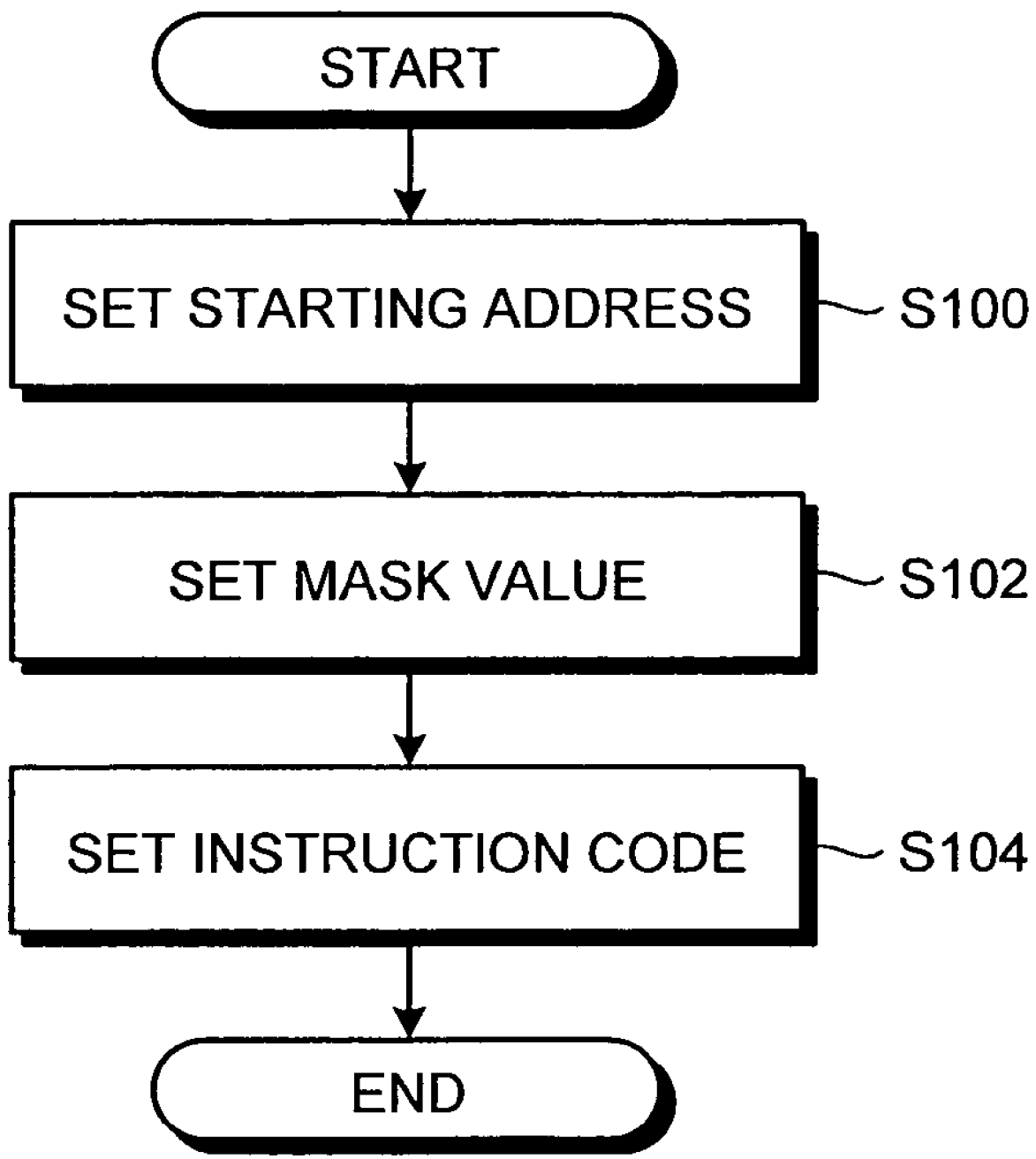
FIG. 3 is a flowchart of a virtual address setting process.

A virtual address setting process and a loading process to the virtual address are performed so that the master processor 20 may refer to the data of the virtual memory of the reactive processor 10. FIG. 3 is a flowchart of the virtual address setting process. First, a starting address of a virtual memory address desired to set is written into the base specification register group 102 (Step S100). A mask value corresponding to the size of the virtual memory is written into the mask specification register group 104 (Step S102). At this time, the starting address and the mask value are respectively written into the base register and the mask register identified by the identical virtual address IDn (n=0 to 3).

The instruction code is written into the code IDn (n=0 to 3) that is the entry corresponding to the virtual address ID set in Step S100 and Step S102 in the instruction code-for-address description buffer 110 (Step S104). The virtual address setting process is thus completed.

For example, when the starting address is written into the virtual address ID0 of the base specification register group 102, the mask value is written into the virtual address ID0 of the mask specification register group 104. Then, the instruction code is written into the code ID0 that is the entry corresponding to the virtual address ID0 in the instruction code-for-address description buffer 110. Thus, when the respective address ranges and the instruction codes are stored in association with the respective identical virtual addresses ID, an address range and its corresponding instruction code can be specified based on the virtual address ID.

Figure 4:
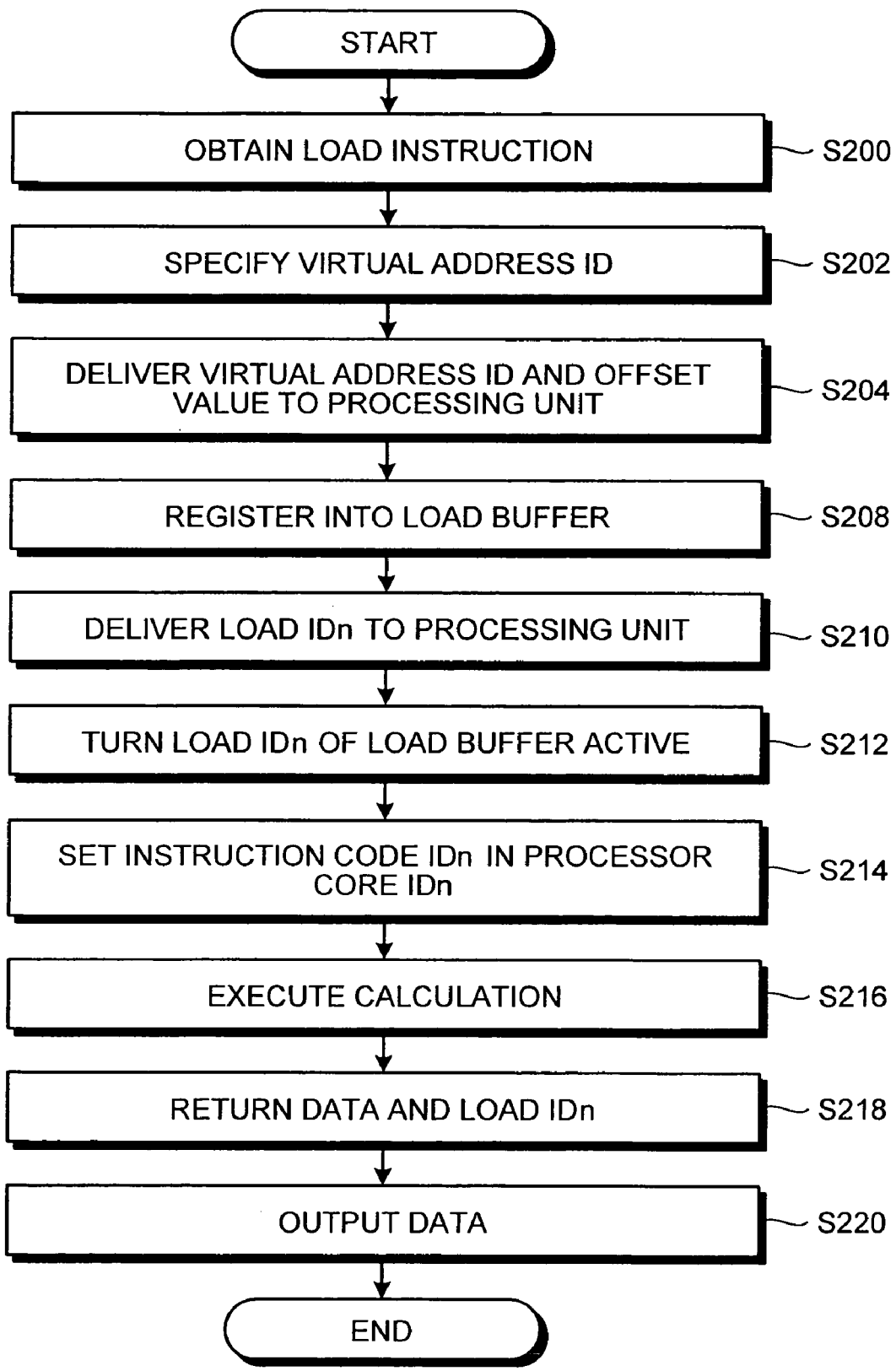
FIG. 4 is a flowchart of a loading process to a virtual address.

FIG. 4 is a flowchart of the loading process to the virtual address. The address decoder 100 obtains the load instruction issued by the master processor 20 (Step S200). The address comparator 106 compares the address range indicated by the load instruction, and the starting address written into the base specification register group 102 and the mask value written into the mask specification register group 104, to specify the virtual address ID where the corresponding address is written (Step S202).

The address comparator 106 delivers the specified virtual address ID and the offset value to the processing unit 120 (Step S204). The load tag is registered into the load buffer 130 (Step S208). The load IDn that is the entry number of the load buffer 130 where the load tag is registered is delivered to a predetermined processor core IDn of the processing unit 120 (Step S210). The load IDn is set in the corresponding version register IDn.

The load IDn registered in the load buffer 130 is turned active (Step S212). The starting address of the code IDn corresponding to the processor core IDn in the instruction code-for-address description buffer 110 is set (Step S214). The processor core IDn performs the calculation according to the instruction code (Step S216).

Upon completion of the calculation, the processor core IDn associates the data resultant from calculation with the load IDn registered in the version register and returns the data to the load buffer 130 (Step S218). The load buffer 130 returns the received data, together with the load tag, to the master processor 20 as the data for the load instruction identified by the load IDn (Step S220). The load process to the virtual address is thus completed.

It is preferable that the instruction code registered into the instruction code-for-address description buffer 110 can refer to the offset value ($offset) of the load-accessed address. Then, one code can define consecutive sequence data. In this case, the value written into a special register for data output ($result) is supplied as the data for the load instruction.

As mentioned above, the master processor 20 obtains the calculated data from the memory I/F 30, whereas the master processor 20 obtains the data calculated at the load time from the reactive processor 10. Since the memory I/F 30 and the reactive processor 10 are mapped flat on the same memory space, the master processor 20 can perform the same processing regardless of distinction between actual memory and virtual memory.

Figure 5:
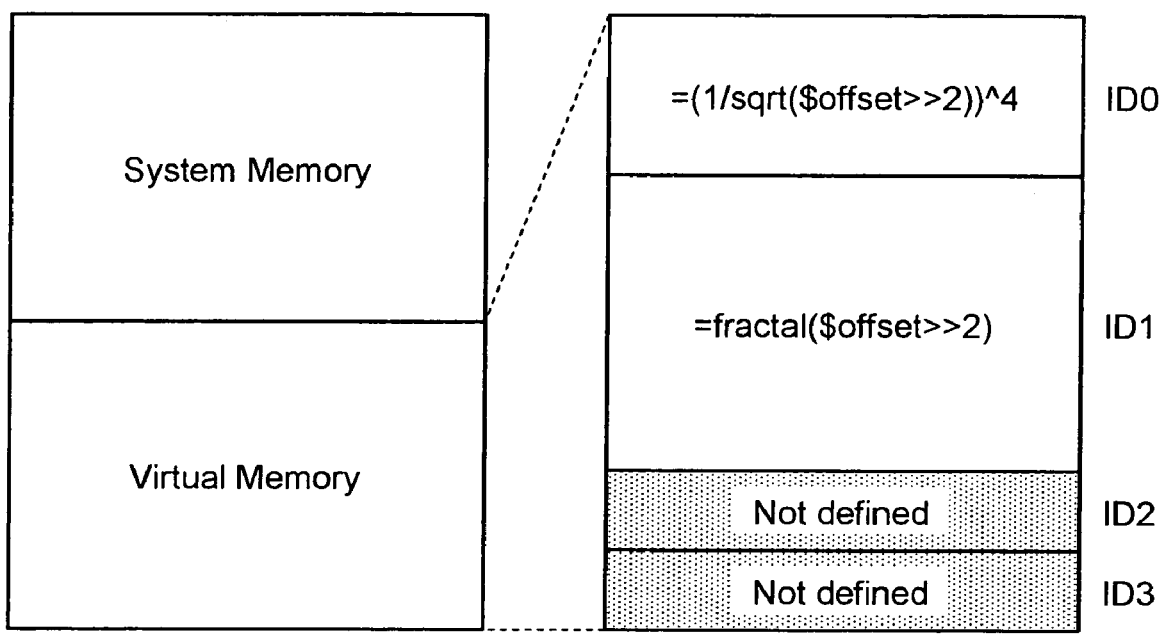
FIG. 5 is a diagram of one example of a memory map.

FIG. 5 is a diagram of one example of the memory map. In the memory map shown in FIG. 5, the actual memory and the virtual memory are allocated. Further, the instruction code (1/sqrt($offset>>2) 4) is assigned to the virtual address ID0 of the virtual memory and the formula "fractal($offset>>2)" is assigned to the virtual address ID1.

Here, the "$offset" is the byte address offset from the starting address of each virtual area, and indicates that the data is defined by the unit of 4 bytes. No assignment is performed on the virtual address ID2 and the virtual address ID3 yet.

The existing system can gain access only to the already calculated data. On the contrary, once an instruction code for a virtual address is registered, the reactive processor 10 in the embodiment can gain access to any of the assigned virtual addresses at any timing.

Therefore, in the calculation of high data parallelism, a memory system incorporating a plurality of the reactive processors 10 can perform more suitable parallel processing than the existing multiprocessor system. Further, the synchronization is not required.

Since the base specification register, the mask specification register, and the instruction code-for-address description buffer are mapped flat on the system bus 50, the master processor 20 can set the parameters using a normal store instruction.

Though the invention is described according to the above embodiment, various modifications or improvements can be made to the above embodiment.

Figure 6:
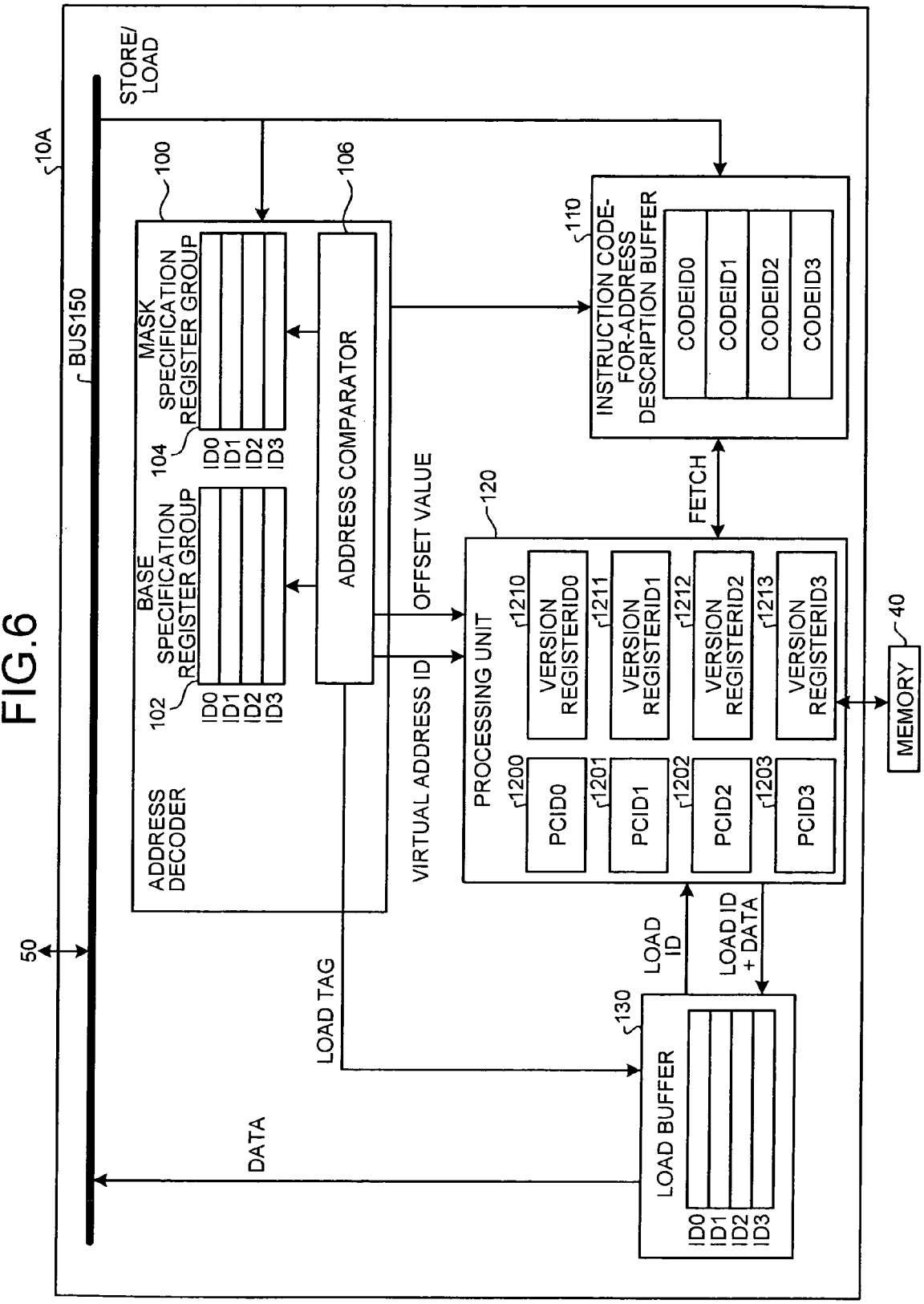
FIG. 6 is a block diagram of a functional structure of a reactive processor according to a first modification.

As a first modification, the reactive processor 10A may have access to the memory 40 directly. FIG. 6 is a block diagram of the functional structure of the reactive processor 10A according to the first modification. As shown in FIG. 6, the processing unit 120 has a memory I/F function and is capable of direct access to the memory 40. In the first modification, each processor core issues the load instruction to the memory 40 to calculate while loading and storing.

Figure 7:
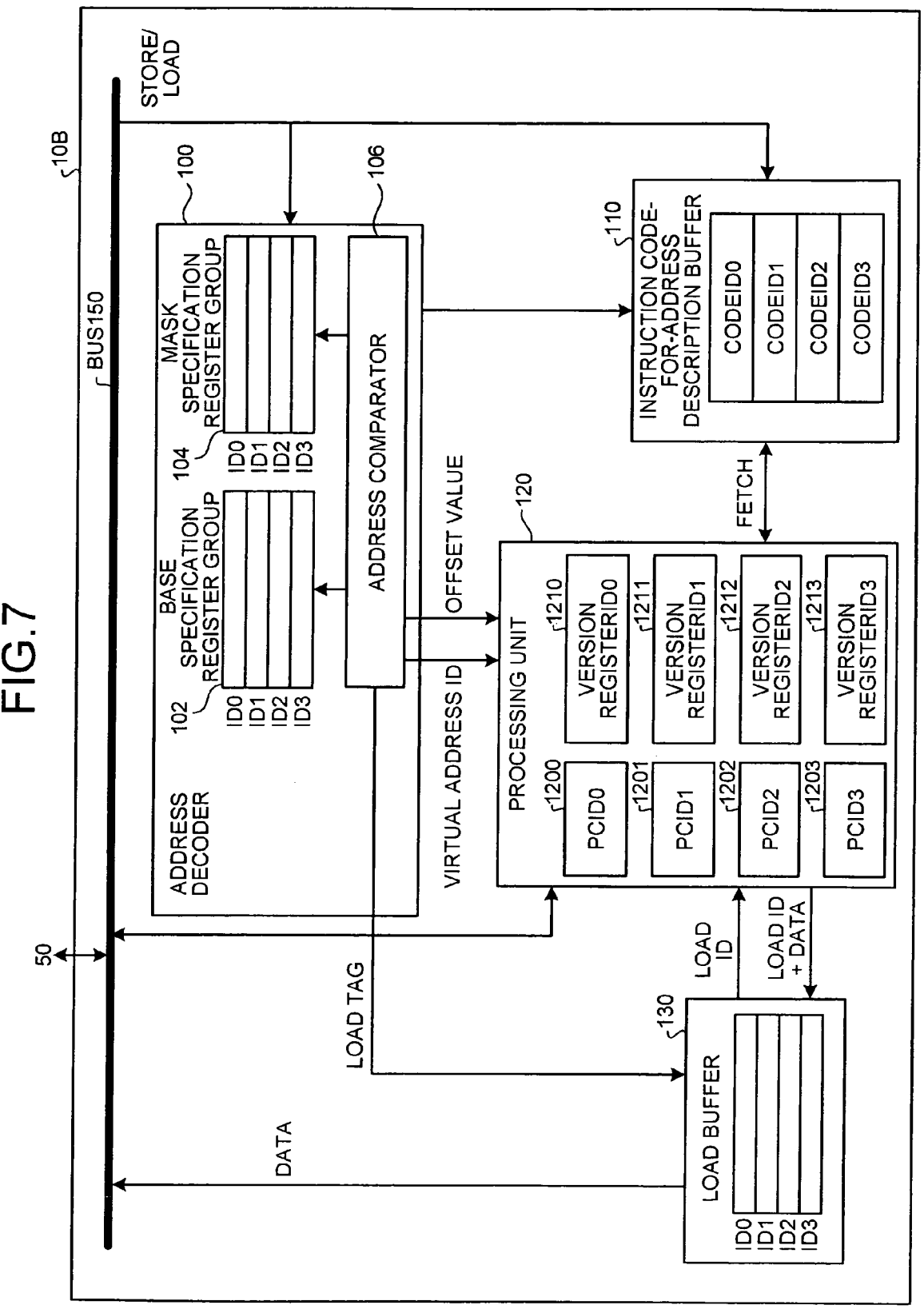
FIG. 7 is a block diagram of a functional structure of a reactive processor according to a second modification.

As a second modification, the reactive processor 10B may have access to the memory I/F 30 or the reactive processor 10B through the system bus 50. FIG. 7 is a block diagram of the functional structure of the reactive processor 10B according to the second modification. As shown in FIG. 7, the processing unit 120 can gain access to the memory I/F 30 or the reactive processor 10B through the system bus 50. In the second modification, similarly to the first modification, each processor core calculates while loading and storing into the memory 40. Alternatively, each processor core can perform computing in a multiplex way within the virtual memory while loading and storing into the reactive processor 10B.

Figure 8:
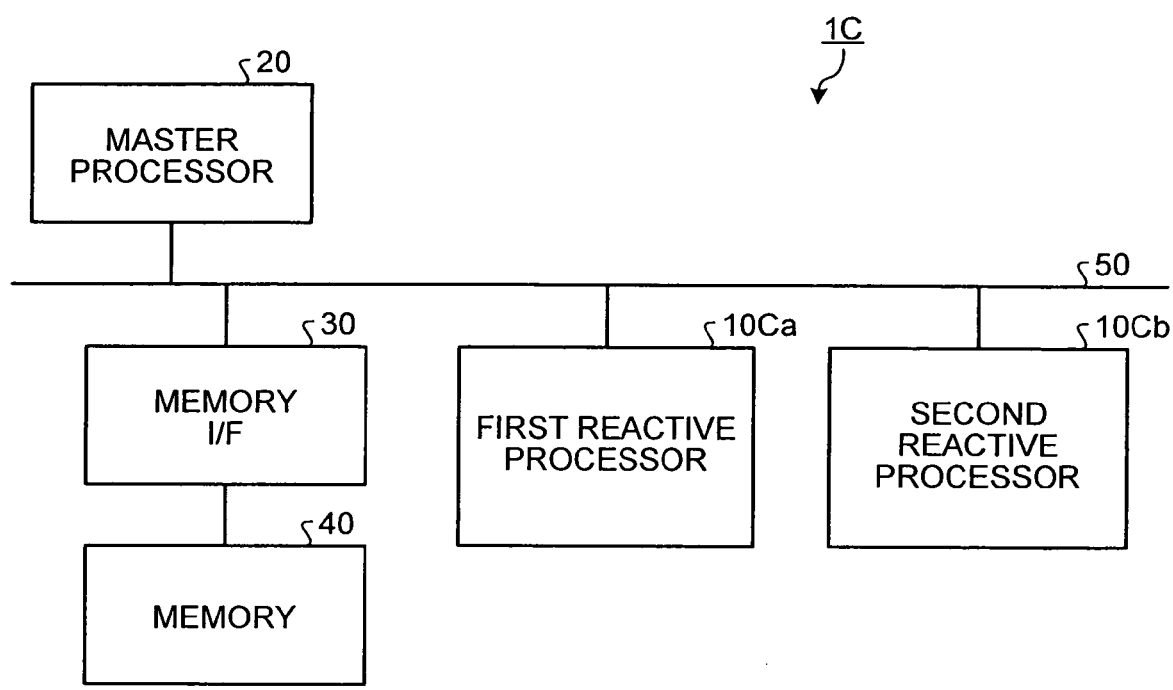
FIG. 8 is a block diagram of an overall structure of a memory system according to a third modification.

FIG. 8 is a block diagram of an overall structure of a memory system 1C according to a third modification. The memory system 1C according to the third modification may have a plurality of reactive processors 10Ca and 10Cb. Then, one of the reactive processors 10Ca and 10Cb issues the load instruction to the virtual memory of the other reactive processor and calculates while loading and storing. Thus, the computing in the virtual memory can be realized in a recursive or a continuous manner.

Figure 9:
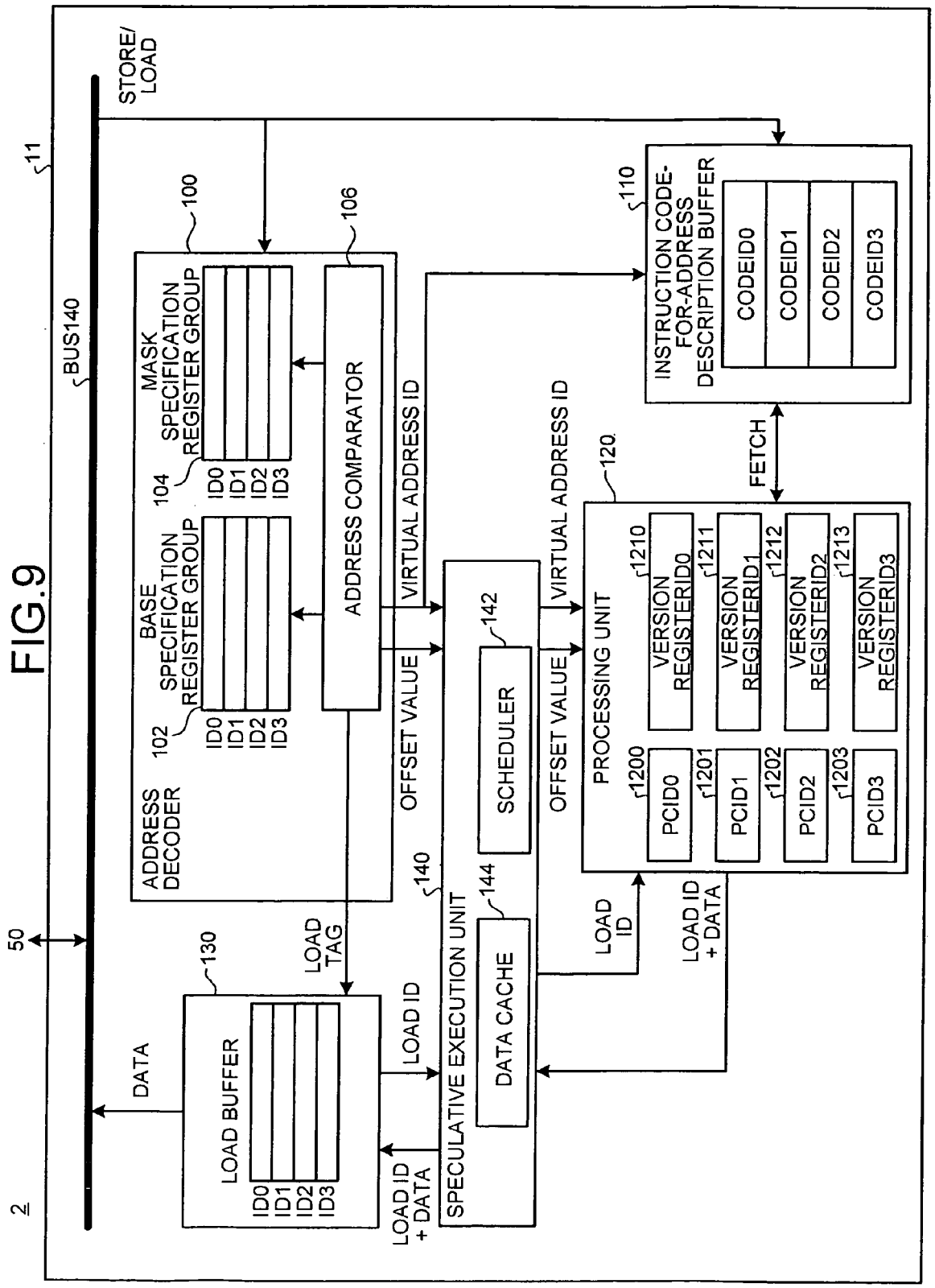
FIG. 9 is a block diagram of a functional structure of a reactive processor in a memory system according to a second embodiment.

FIG. 9 is a block diagram of the functional structure of a reactive processor 11 in a memory system 2 according to the second embodiment. The reactive processor 11 of the memory system 2 according to the second embodiment further includes a speculative execution unit 140. The speculative execution unit 140 includes a scheduler 142 and a data cache 144.

The scheduler 142 predicts the load instruction issued from the master processor 20 while confirming the update condition of the address and instruction code registered into the address decoder 100 and the instruction code-for-address description buffer 110. The scheduler 142 then directs the processing unit 120 to calculate the data for the load instruction. The data cache 144 stores the data obtained by the instruction of the scheduler 142.

Figure 10:
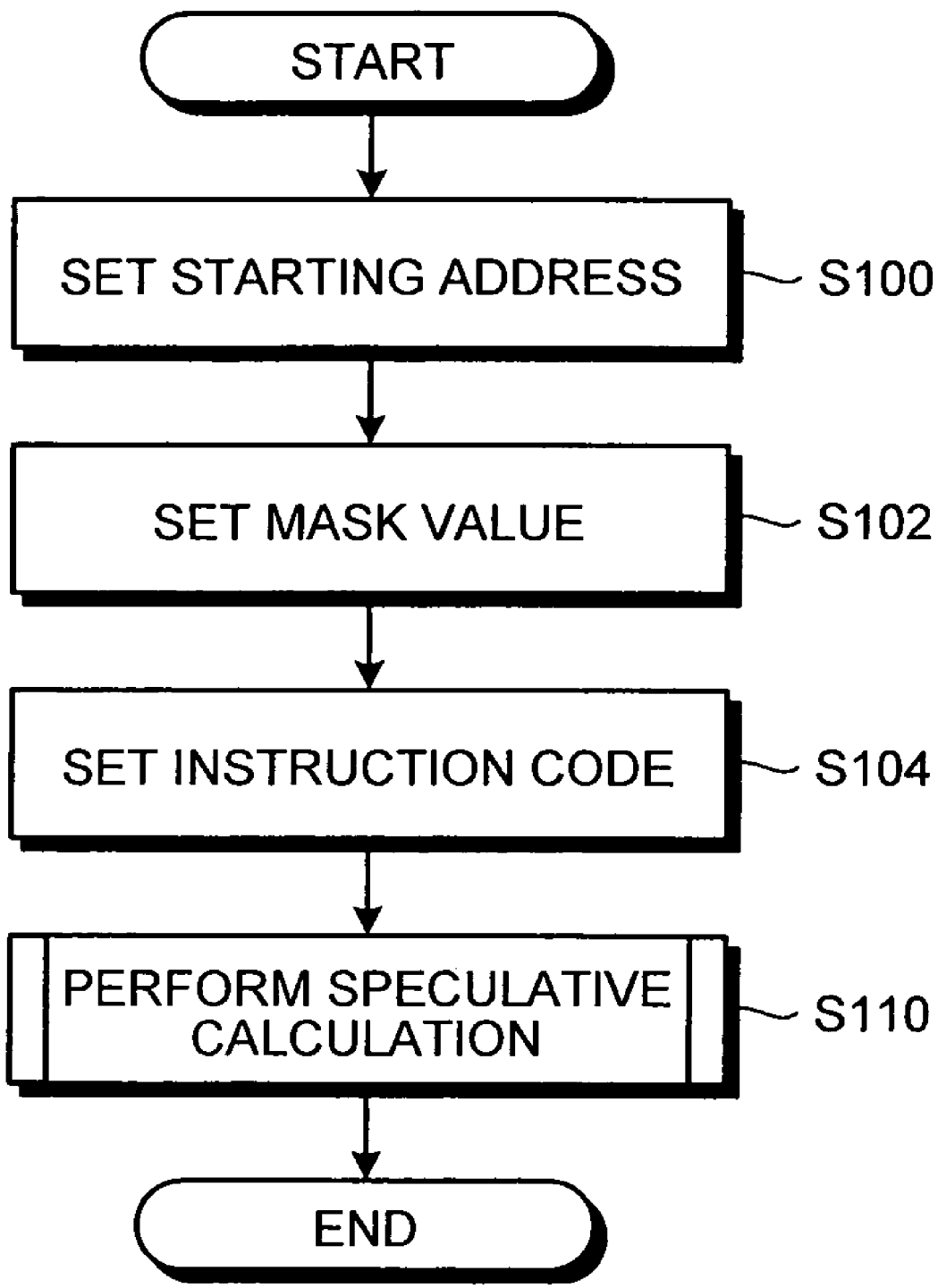
FIG. 10 is a flowchart of a virtual address setting process according to the second embodiment.

FIG. 10 is a flowchart of the virtual address setting process according to the second embodiment. The process from Step S100 to Step S104 is the same as the process from Step S100 to Step S104 described with reference to FIG. 3 according to the first embodiment. After the instruction code is set, the speculative calculation is performed (Step S110).

Figure 11:
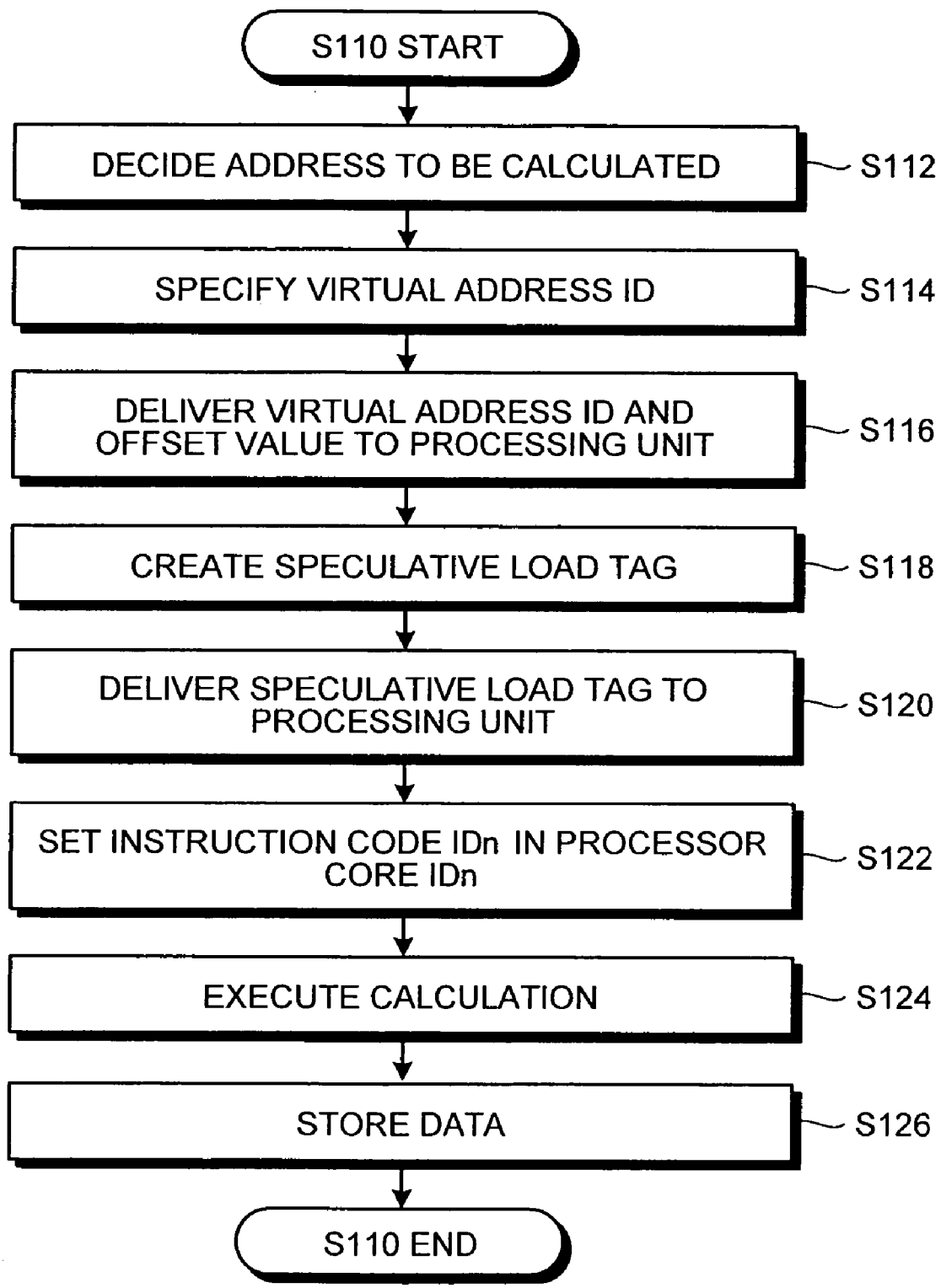
FIG. 11 is a flowchart of a detailed processing in speculative calculation.

FIG. 11 is a flowchart of the detailed processing in the speculative calculation (Step S110). The scheduler 142 determines an address to be calculated by the instruction code-for-address description buffer 110 (Step S112). The scheduler 142 specifically determines the address to be calculated, according to the update condition of the address registered in the address decoder 100 and the update condition of the instruction code stored in the instruction code-for-address description buffer 110. More specifically, an address, which is newly registered into the address decoder 100 and the instruction code-for-address description buffer 110, is determined as the address to be calculated.

The virtual address ID corresponding to the determined address is specified (Step S114). The specified virtual address ID and offset value are delivered to one of the processor cores IDn (n=0 to 3) 1200 to 1203 of the processing unit 120 (Step S116). The scheduler 142 creates the speculative load ID (Step S118). Here, the speculative load ID is the identification information different from the load ID of the load buffer 130 and inherent to the scheduler 142. Thus, the load ID and the speculative load ID are identified. Thus, the processing unit 120 can judge whether the instruction is the load instruction from the master processor 20 or the instruction of speculative execution from the scheduler 142.

The speculative load ID is delivered to a predetermined processor core IDn of the processor cores IDn (n=0 to 3) 1200 to 1203 in the processing unit 120 (Step S120). The corresponding instruction code is set in a predetermined processor core IDn (Step S122). The processor core IDn performs the calculation (Step S124). The obtained data is stored into the data cache 144 in association with the virtual address ID and the offset value (Step S126). As mentioned above, the speculative calculation (Step S110) is completed.

The processor core IDn delivers the obtained data to the data cache 144 in association with the speculative load ID. The data cache 144 can recognize the data to be the data for the instruction of the scheduler 142.

Figure 12:
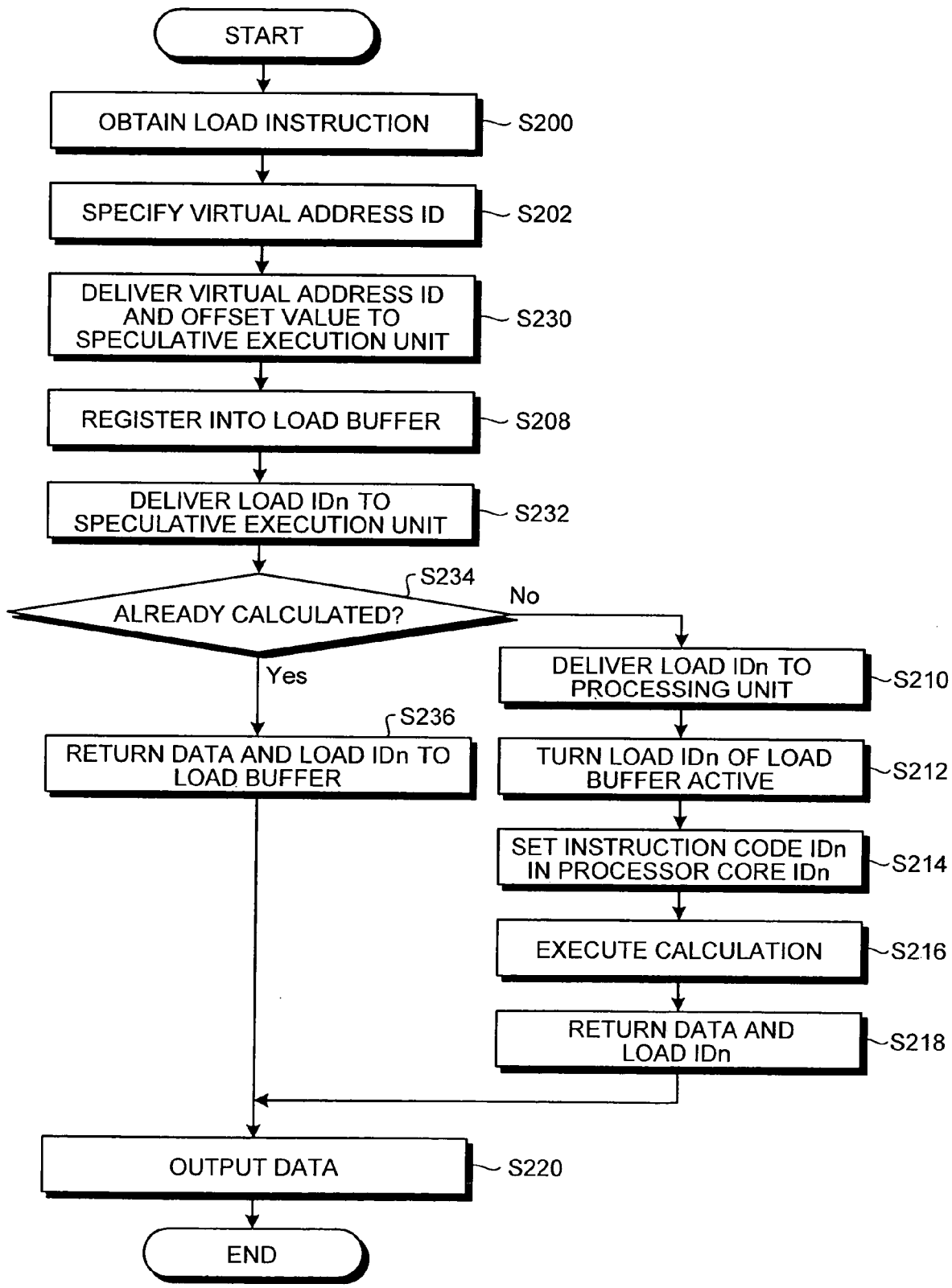
FIG. 12 is a flowchart of a loading process to a virtual address according to the second embodiment.

FIG. 12 is a flowchart of the loading process to the virtual address according to the second embodiment. The process in Step S200 and Step S202 is the same as the process in Step S200 and Step S202 described with reference to FIG. 4 according to the first embodiment. The virtual address ID and the offset value are delivered to the speculative execution unit 140 (Step S230). The load tag is registered into the load buffer 130 (Step S208).

The load IDn where the load tag is registered is delivered to the speculative execution unit 140 (Step S232). The scheduler 142 compares the virtual address ID and the offset value obtained in Step S230 with the address range indicated by the load instruction and confirms whether this address range is already calculated or not. When the address range is already calculated (Yes in Step S234), the data stored in the data cache 144 is returned to the load buffer 130 together with the load IDn (Step S236). The load buffer 130 returns the received data together with the load tag to the master processor 20 as the data for the load instruction identified by the load IDn (Step S220).

When it is determined in Step S234 that the address range indicated by the load instruction is not calculated (No in Step S234), the processing proceeds to Step S210. The process from Step S210 to Step S218 is the same as the process from Step 210 to Step S218 described with reference to FIG. 4 according to the first embodiment. The loading process to the virtual address is thus completed.

As mentioned above, in the second embodiment, the data in the corresponding address range is previously calculated at a timing prior to the timing of acquisition of a load instruction, based on a prediction that the load instruction will be obtained. Therefore, it is possible to return the data already obtained through calculation without calculating data after obtaining the load instruction. Thus, the data can be returned to the master processor 20 more instantly.

The other components of the memory system 2 and the processing according to the second embodiment are the same as the components of the memory system 1 and the processing according to the first embodiment.

As mentioned above, according to the embodiment, the memory area viewed from the master processor 20 can be easily expanded when a virtual memory area is mounted into a system. Further, since data can be retrieved from a different port from the actual memory, to improve the bandwidth of the memory can be significantly improved in the whole system.

The computing power (data supply ability as a system) of the virtual memory is expected to be improved as much as the improvement in computing power according to the process miniaturization. Therefore, a gap can be eliminated between the computing power and the data supply ability created by the process miniaturization.

Further, the present invention can be applied to the storage of static data, such as texture data in a 3D graphic system other than the data calculated dynamically within a program.

Specifically, the static data is described as a program of the virtual memory. The data can be read out and used as necessary. Accordingly, the texture data that can be described as a program of the virtual memory can be read out from the virtual memory and the other texture data can be stored into the conventional real memory. Thus, the capacity of graphic memory, which tends to be scarce as the image quality enhances, can be readily increased.

When viewed from the processor which issues the load request to the virtual memory, the processor on the virtual memory can be regarded as one of the processors operating in cooperation with the processor, and the whole system can be regarded as a multiprocessor system. In other words, the memory systems 1 and 2 according to the embodiments can be regarded as means for new cooperative operation among the processors in a multiprocessor system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor comprising:
an address specifying unit that specifies an address range on a virtual storage area;
an instruction code setting unit that sets an instruction code for a process of deciding data corresponding to the specified address range;
a calculating unit that calculates the data corresponding to the specified address range, according to the instruction code set for the specified address range;
a load instruction obtaining unit that obtains a load instruction for the specified address range;
a data output unit that supplies the data calculated by the calculating unit corresponding to the specified address range indicated by the load instruction, as data for the load instruction;
a data storing unit that stores the data calculated by the calculating unit in association with the specified address range; and
a data managing unit that, when the load instruction is obtained, supplies the data stored into the data storing unit to the data output unit when the data corresponding to the specified address range indicated by the load instruction is stored in the data storing unit,
wherein the data managing unit, when the load instruction is obtained, makes the calculating unit calculate the data corresponding to the specified address range when the data corresponding to the specified address range indicated by the load instruction is not stored in the data storing unit.

2. The processor according to claim 1, wherein the calculating unit starts calculating the data corresponding to the specified address range according to the instruction code under condition that the specified address range is specified and the instruction code is set.

3. The processor according to claim 1, wherein the instruction code setting unit sets the instruction code in which a value which is uniquely decided based on the respective addresses within the specified address range can be used as an argument.

4. The processor according to claim 1, further comprising:
an instruction code storing unit that stores address range identification information, which is employed for identifying the specified address range, and the instruction code, which is set for the specified address range, in association with each other,
wherein the calculating unit calculates the data for the specified address range, according to the specified address range indicated by the load instruction and the instruction code stored in the instruction code storing unit in association with the address range identification information.

5. The processor according to claim 4, further comprising:
a register which stores a starting address and a length of the specified address range in association with the address range identification information which is employed for identifying the starting address and the length; and
an address comparing unit that compares the specified address range indicated by the load instruction obtained by the load instruction obtaining unit with the starting address and the length stored in the register, to specify the address range identification information corresponding to the specified address range indicated by the load instruction,
wherein the address specifying unit specifies the starting address of the specified address range and the length of the specified address range, and the calculating unit calculates the data for the address according to the instruction code stored in the instruction code storing unit in association with the address range identification information.

6. The processor according to claim 1, further comprising:
a plurality of the calculating units; and
a load instruction identification information storing unit that stores load instruction identification information which is employed for identifying the load instruction,
wherein the calculating unit further obtains the load instruction identification information which is employed for identifying the load instruction, and
the data output unit obtains the load instruction identification information and the data from the calculating unit and outputs the data as the data for the load instruction identified by the load instruction identification information.

7. The processor according to claim 1, further comprising:
a system memory interface which gains access to a system memory which is directly connected to the processor through the calculating unit, wherein
the calculating unit gains access to the system memory through the system memory interface, and performs loading and storing to the system memory, to obtain the data for the load instruction.

8. The processor according to claim 1, wherein the calculating unit gains access via a bus to the system memory which is connected to the processor through the bus, and performs loading and storing to the system memory, to obtain the data for the load instruction.

9. A virtual memory system comprising a first processor and a second processor, wherein each of the first processor and the second processor includes:
an address specifying unit that specifies an address range on a virtual storage area,
an instruction code setting unit that sets an instruction code for a process of deciding data corresponding to the specified address range,
a calculating unit that calculates the data corresponding to the specified address range, according to the instruction code set for the specified address range,
a load instruction obtaining unit that obtains a load instruction for the specified address range, and
a data output unit that supplies the data calculated by the calculating unit corresponding to the specified address range indicated by the load instruction, as the data for the load instruction,
the calculating unit of the first processor issues a load instruction to the second processor,
the load instruction obtaining unit of the second processor obtains the load instruction from the first processor,
the calculating unit of the second processor calculates the data for the load instruction obtained from the first processor,
the data output unit of the second processor supplies the data obtained through the calculating unit of the second processor to the first processor, and
the calculating unit of the first processor calculates the data, using the data obtained from the second processor.

10. A virtual storing method using a first processor and a second processor, comprising:
specifying an address range on a virtual storage area in the first processor;
setting an instruction code for a process of deciding data corresponding to the specified address range in the first processor;

specifying an address range on a virtual storage area in the second processor;

setting an instruction code for a process of deciding the data corresponding to the specified address range in the second processor;

issuing a load instruction from the first processor to the second processor;

specifying the address range indicated by the load instruction in the second processor;

calculating the data for the address range according to the instruction code set for the address range, in the second processor;

supplying the calculated data from the second processor to the first processor;

calculating the data for the address range by using the supplied data in the first processor;

obtaining the load instruction for the specified address range in the first processor; and supplying the data calculated for the address range indicated by the load instruction as the data for the obtained load instruction in the first processor.

* * * * *